(12) United States Patent
Jaros et al.

(10) Patent No.: US 9,964,452 B2
(45) Date of Patent: May 8, 2018

(54) MEASURING THE TEMPERATURE OF THE ROTOR OF AN ELECTRICAL MACHINE

(71) Applicants: Robert Bosch GmbH, Stuttgart (DE); SEG AUTOMOTIVE GERMANY GMBH, Stuttgart OT (DE)

(72) Inventors: Rolf Jaros, Backnang (DE); Sebastian Jansen, Ludwigsburg (DE)

(73) Assignees: Robert Bosch GmbH, Stuttgart (DE); SEG AUTOMOTIVE GERMANY GMBH, Stuttgart (DE)

( * ) Notice: Subject to any disclaimer, the term of this patent is extended or adjusted under 35 U.S.C. 154(b) by 213 days.

(21) Appl. No.: 14/844,853

(22) Filed: Sep. 3, 2015

(65) Prior Publication Data

US 2016/0076946 A1     Mar. 17, 2016

(30) Foreign Application Priority Data

Sep. 12, 2014   (DE) .................. 10 2014 218 381

(51) Int. Cl.
*G01N 25/00* (2006.01)
*G01K 7/36* (2006.01)
*H02K 11/00* (2016.01)
*G01K 13/08* (2006.01)

(52) U.S. Cl.
CPC .............. *G01K 7/36* (2013.01); *G01K 13/08* (2013.01); *H02K 11/0047* (2013.01)

(58) Field of Classification Search
None
See application file for complete search history.

(56) References Cited

U.S. PATENT DOCUMENTS

| 2010/0204862 A1* | 8/2010 | Uejima ................. B60W 20/15 |
| | | 701/22 |
| 2011/0181217 A1* | 7/2011 | Vollmer ................... G01K 7/42 |
| | | 318/400.21 |
| 2014/0355644 A1* | 12/2014 | Gupta ...................... G01K 7/38 |
| | | 374/4 |

FOREIGN PATENT DOCUMENTS

JP         2004222387 A   *  8/2004  ............... G01K 7/38

* cited by examiner

*Primary Examiner* — Erica Lin
(74) *Attorney, Agent, or Firm* — Norton Rose Fulbright US LLP; Gerard A. Messina

(57) ABSTRACT

A method for measuring the temperature of a permanent magnet disposed on a rotor of an electrical machine, a magnetic property of the permanent magnet dependent on the temperature of the permanent magnet being sensed and the temperature of the permanent magnet being ascertained therefrom, and to an electrical machine, a processing unit, and a computer program for carrying it out.

17 Claims, 2 Drawing Sheets

MEASURING THE TEMPERATURE OF THE ROTOR OF AN ELECTRICAL MACHINE

RELATED APPLICATION INFORMATION

The present application claims priority to and the benefit of German patent application no. 10 2014 218 381.2, which was filed in Germany on Sep. 12, 2014, the disclosure of which is incorporated herein by reference.

FIELD OF THE INVENTION

The present invention relates to a method for measuring the temperature of a permanent magnet disposed on a rotor of an electrical machine, and to an electrical machine, a processing unit, and a computer program for carrying it out.

BACKGROUND INFORMATION

Electrical machines are used in vehicles, for example, as a motor or starter for an internal combustion engine or, for example, as a generator for generating electricity. In modern vehicles, electrical machines are also used as a combination of motor and generator, as a so-called "starter generator" (SG) or boost recuperation machine (BRM). These are electrical machines that can be operated in a vehicle as an electric motor or as a generator, as necessary.

As a generator, starter generators must be able to handle all the tasks conventionally assigned to the generator, namely supplying electricity to the vehicle electrical system and charging the vehicle battery. As an electric motor, when starting the internal combustion engine starter generators must quickly bring the engine's crankshaft to the rotation speed necessary for starting.

Electrical machines constituting boost recuperation machines can be used in particular in hybrid vehicles in order to be operated in both motor mode and generator mode. At low rotation speeds at which an internal combustion engine is not yet providing its full torque, it can be assisted by operating the electrical machine in motor mode. Upon deceleration of the vehicle, operating the electrical machine in generator mode can convert kinetic energy into electrical energy which can then be stored.

Electrical machines can be cooled with an air cooling system. A particular challenge is presented by high power densities together with relatively high ambient temperatures in the engine compartment. These temperatures can exceed 120° C., at which the thermal tolerance limit of individual components can be exceeded.

In order to avoid damage from excessive temperature, temperature sensors can be installed in a housing of the electrical machine. Alternatively, the temperature of a power converter associated with the electrical machine can be sensed and monitored using temperature sensors. Temperature sensors can furthermore be installed directly in windings of the electrical machine.

A winding temperature T can be ascertained from a resistance measurement $R(T)=U/I$ and a knowledge of the temperature dependence of the resistance. This requires an accurate measurement of the current through the winding, however, which is complex and for which no measuring arrangement is usually present.

A measurement of the particularly critical rotor temperature is thus not possible. An attempt is therefore made to deduce the rotor temperature, by way of a model, from the result of measuring the stator temperature. This procedure is susceptible to error. The thermally highly stressed rotor of the electrical machine is very difficult to access for direct temperature measurement. Known signal transfer methods, for example inductive transfer units or slip ring-assisted systems, are usually eliminated due to high cost and insufficient operating reliability.

A need therefore exists for simplified temperature measurement in particular for the rotor of an electrical machine.

SUMMARY OF THE INVENTION

The present invention is a method for measuring the temperature of a permanent magnet disposed on a rotor of an electrical machine, as well as an electrical machine, a processing unit, and a computer program for carrying it out, having the features described herein. Advantageous embodiments are the subject matter of the further descriptions herein and of the description that follows.

The present invention allows the temperature of one or more components of the rotor of the electrical machine to be ascertained without using a temperature sensor installed in or on the rotor. The temperature dependence of a magnetic property of the permanent magnet is used and, in particular, the temperature-dependent value (field strength value or flux density value) of the magnetic field generated by the permanent magnet is determined. This is because it is known that the remanence of a permanent magnet, and thus the field strength or flux density of the magnetic field generated by it, decrease with increasing temperature. Usefully, a magnetic field sensor, e.g. Hall sensor or (G)MR sensor, that in particular does not co-rotate is used to sense the magnetic field value.

The invention is usable particularly advantageously in an electrical machine operable in both motor mode and generator mode, since in this case a permanent magnet ("rotor position encoder magnet") is usually disposed in any case on the rotor in order to determine the angular position ("rotor position") and/or rotation speed of the rotor from the profile of the magnetic field, i.e. the magnetic field generated by the permanent magnet is also sensed in any case, and merely needs to be correspondingly evaluated.

The invention affords particular advantages in electrical machines operable in both motor mode and generator mode in the vehicle (i.e. in particular SGs or BRMs) because the rotor therein is operated close to the thermal tolerance limit, and without an accurate knowledge of the temperature, a premature limitation of drive power is necessary. Power output can be increased as a result of the improved rotor temperature measurement provided by the present invention.

Costs are reduced because no temperature sensors, and also no associated contact points, leads, and evaluation units, are required in the electrical machine. Operating reliability is improved because temperature sensors in air-cooled electrical machines are susceptible to failure in particular as a result of environmental attacks (salt spray or the like) and vibration.

The temperature information obtained from the measurement of magnetic field strength can serve as an input variable for a mathematical model of the thermal behavior of the rotor or of the entire electrical machine. This model is stored in the form of a (software) program and calculates, from the magnet temperature and optionally from further input variables (e.g. exciter current, phase currents, or power loss), the temperatures at relevant locations or of components of the rotor or of the machine as a whole (i.e. including the stator).

It is to be expected that the magnetic properties of permanent magnets are subject to sample-specific fluctuations that can be expressed as magnetic fields of differing intensity at the same temperature. The magnetic field sensor can also exhibit accuracy tolerances. In order to prevent these tolerances from being reflected in the ascertained magnet temperature, a calibration of the signal can be accomplished upon startup and/or during utilization of the electrical machine. For this, the sensor signal is calibrated to the existing magnet temperature under defined boundary conditions. The temperature is usefully measured for this purpose using a temperature measurement device.

The invention can be applied to electrical machines of various designs, e.g. synchronous machines or asynchronous machines.

If a rotor position sensor is not required for operation of an electrical machine, a magnet exclusively for temperature determination can be mounted on the rotor shaft. The field strength of this magnet is measured with the aid of a magnetic field sensor that, in particular, does not co-rotate, and the rotor temperature is ascertained from the signal.

Good thermal coupling of the magnet to the rotor is particularly advantageous for obtaining a small temperature difference between the exciter winding and magnet. For this purpose the magnet can be fastened to the rotor shaft, for example, via a metal cup. Thanks to the high thermal conductivity of the metal cup, the magnet is heated uniformly to a temperature that corresponds approximately to the rotor temperature that is to be ascertained.

A temperature difference of <10 K between the magnet and the rotor shaft close to the rotor is particularly advantageous. This temperature difference is intended to be measured, with the rotor at a standstill and at a constant rotor temperature of approximately 150° C., with the rotor and magnet at thermal equilibrium; air flow impingement is to be avoided. This provides the necessary precision for the method.

It is particularly useful to use a magnet having magnetic properties with a particularly pronounced dependence on temperature, in particular to select a magnetic material having a temperature-dependent change in remanent flux density of at least 0.1%/K.

Implementation of the method in form of software is also advantageous because it entails particularly low costs, especially if an executing control unit is also used for further purposes and is therefore present in any case. Suitable data media for furnishing the computer program are, in particular, diskettes, hard drives, flash memories, EEPROMs, CD-ROMs, DVDs, and many others. Downloading a program via computer networks (Internet, intranet, etc.) is also possible.

Further advantages and embodiments of the invention are evident from the description and from the appended drawings.

It is understood that the features recited above and those yet to be explained below are usable not only in the respective combination indicated, but also in other combinations or in isolation, without departing from the scope of the present invention.

The invention is schematically depicted in the drawings on the basis of an exemplifying embodiment, and will be described in detail below with reference to the drawings.

DETAILED DESCRIPTION

Figure 1:
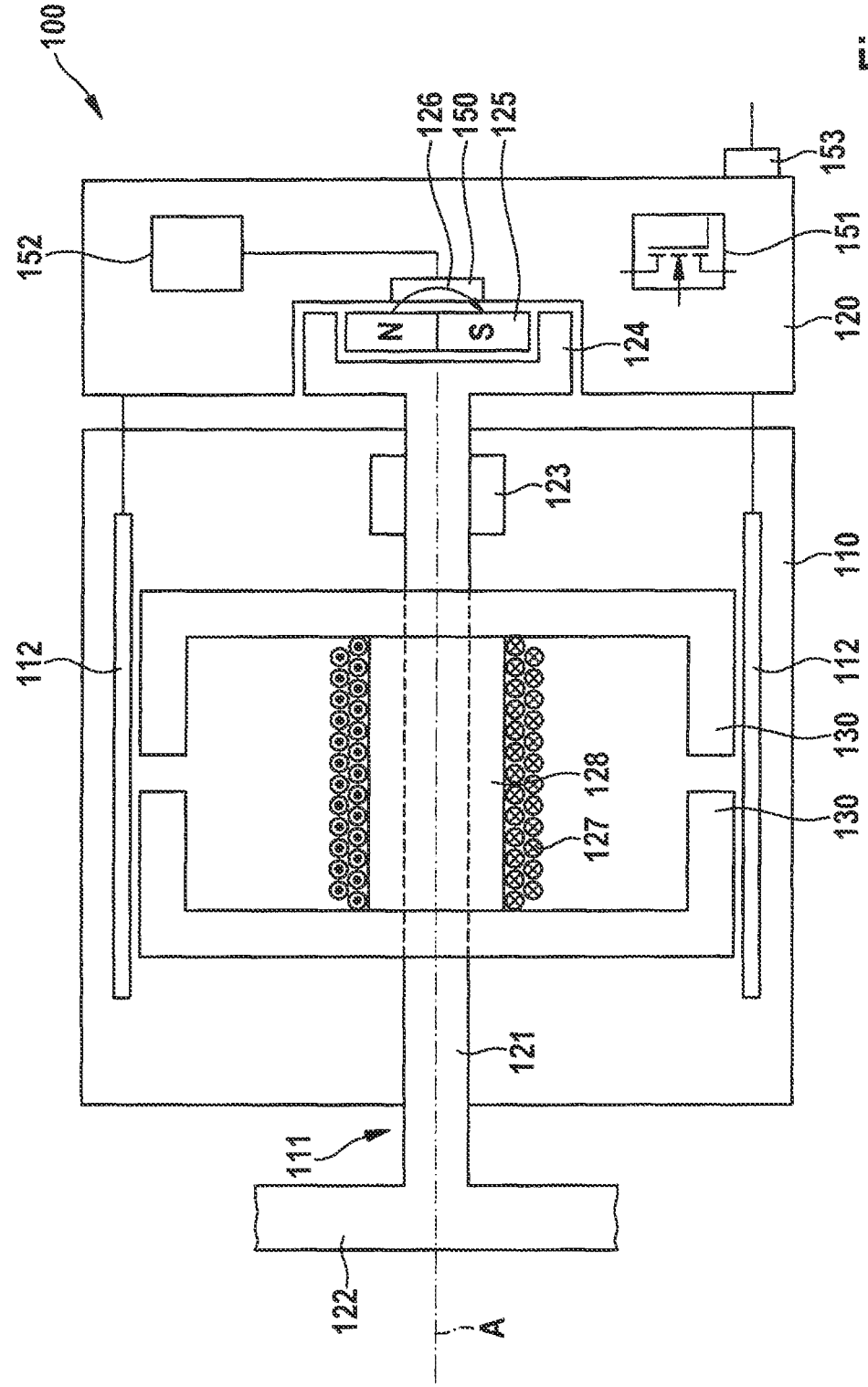
FIG. 1 schematically depicts an electrical machine according to an embodiment of the invention, having a processing unit for identifying the temperature of a permanent magnet that is disposed on the rotor of the electrical machine.

An electrical machine according to an embodiment of the invention, embodied here as a boost recuperation machine, is depicted in FIG. 1 in a schematic sectioned view and labeled 100 in its entirety. Electrical machine 100 has a mechanical part 110 and an electronic part 120.

A rotor 111 rotating around a rotation axis A and a stationary stator 112 are disposed in mechanical part 110.

Rotor 111 has a rotor shaft 121 that is nonrotatably connected to a belt pulley 122. Belt pulley 122 serves for torque-transferring coupling to an internal combustion engine of a vehicle or to the engine's crankshaft. Rotor shaft 121 extends through mechanical part 110 of electrical machine 100 and is in particular rotatably mounted on a bearing 123. One or more fan impellers (not shown) may also be disposed on the rotor shaft for air cooling of electrical machine 100.

In the embodiment depicted, a mount 124 having a permanent magnet 125 fastened thereon is disposed on that end of rotor shaft 121 which faces away from belt pulley 122. Mount 124 is embodied here in cup-shaped fashion, permanent magnet 125 being placed in the cup and fastened there, in particular press-fitted and/or adhesively bonded in. Magnetic field 126 generated by permanent magnet 125 penetrates through a magnetic field sensor 150, explained in further detail below, in electronic part 120 of electrical machine 100.

Stator 112 of electrical machine 100 has a stator winding. Usual stator windings of electrical machines in vehicles are of three- or five-phase configuration. The stator winding is electrically conductively connected to electronic part 120.

Electrical machines in vehicles are often configured as claw pole machines, so-called claws 130 being disposed on rotor shaft 121. In a region surrounded by claws 130, rotor shaft 121 has the magnetic effective exciter, which has a rotor winding or exciter winding 127 that is wound around a rotor core 128. The rotor core is usually made of a ferromagnetic material having a low remanent flux density, and serves to intensify the magnetic field that is generated by an exciter current flowing through rotor winding 127. When rotor winding 127 is energized, magnetic north and south poles form at the ends of claws 130. Permanent magnets can additionally be mounted between adjacent claws 130.

A power converter 151, symbolized here by a transistor symbol, is located in electronic part 120 of the electrical machine. The phases of the stator winding of the electrical machine are connected via power converter 151 to an electrical system of the vehicle. The electrical machine can be operated as a motor or as a generator by corresponding application of control to the power converter, as is sufficiently known in the existing art. Control can be applied to the switching elements of power converter 151 in particular by a control device or control unit 152.

Control device 152 is furthermore connected in signal-transferring fashion to magnetic field sensor 150, and is configured, inter alia, to identify the rotation speed and/or angular position (so-called "rotor position") of rotor 111. This information is important in particular for motor-mode operation of the electrical machine. Electrical machine 100 furthermore possesses terminals or an interface 153 through which electrical machine 100 can be connected both in current-transferring fashion to the vehicle electrical system and in data-transferring fashion to other control units of the vehicle.

In the context of the invention, control device 152 is configured in particular to determine a temperature of permanent magnet 125 and thus also, indirectly, a temperature of rotor 111 and in particular of rotor winding 127. This is because, in particular, the field strength or flux density of magnetic field 126 generated by permanent magnet 125 depends on the temperature of the permanent magnet, so that the determination or measurement of the strength of magnetic field 126 makes it possible to deduce, among other things, the temperature of permanent magnet 125 and furthermore, by way of corresponding temperature models, the temperature of exciter winding 127; this is explained in particular with reference to FIG. 2 on the basis of an embodiment of the method according to the present invention.

Figure 2:
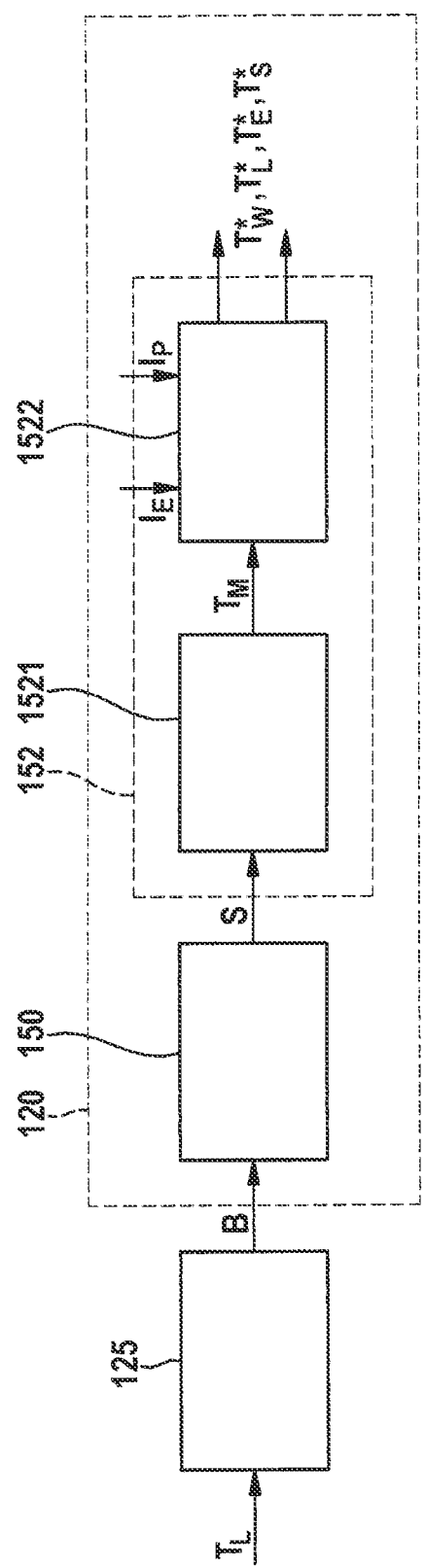
FIG. 2 is a block diagram showing an embodiment of a method according to the present invention.

FIG. 2 shows that the temperature $T_L$ of the rotor acts on permanent magnet 125 and thereby influences the magnetic flux density B generated by the permanent magnet. The magnetic flux density B is sensed by magnetic field sensor 150 in electronic part 120 of electrical machine 100 and is transferred to control device 152 as a measured signal S. In control device 152, the temperature $T_M$ of permanent magnet 125 is calculated in a calculation block 1521. A corresponding characteristics diagram can, in particular, be stored for this purpose in control device 152, said diagram containing a correlation between the magnetic flux density B at the sensor location and the magnet temperature $T_M$.

The calculated magnet temperature $T_M$ is then conveyed to a model 1522 of the thermal behavior of the electrical machine, which is implemented here as a program in control device 152. It can also, however, be implemented as a program in another processing unit. Further variables influencing the temperature, such as an exciter current $I_E$ and/or a phase current $I_P$ (i.e. current through the stator winding) are optionally and may be delivered to model 1522 of the thermal behavior of the electrical machine. Model 1522 of the thermal behavior of the electrical machine then calculates, from the delivered variables, a temperature of one or more components of the rotor or of the electrical machine, for example a temperature $T_W^*$ of rotor shaft 121, a temperature $T_L^*$ of bearing 123, a temperature $T_E^*$ of exciter winding 127, a temperature $T_S^*$ of the stator winding, a temperature of permanent magnets that may be located between adjacent claws 130 or elsewhere, and so forth. These temperatures may then be used for operation of the electrical machine in order to avoid excessive temperatures and damage associated therewith.

What is claimed is:

1. A method for measuring a temperature of a permanent magnet disposed on a rotor of an electrical machine, the method comprising:
   sensing a magnetic property of the permanent magnet dependent on the temperature of the permanent magnet;
   determining the temperature of the permanent magnet therefrom; and
   indirectly determining a temperature of at least one component of the rotor based on the temperature of the permanent magnet.

2. The method of claim 1, wherein the temperature of the permanent magnet is ascertained from the value of the magnetic property of the permanent magnet dependent on the temperature of the permanent magnet.

3. The method of claim 1, wherein the temperature of the permanent magnet is ascertained from a change over time in the magnetic property of the permanent magnet dependent on the temperature of the permanent magnet.

4. The method of claim 1, wherein a field strength or flux density of the magnetic field generated by the permanent magnet is sensed as the magnetic property of the permanent magnet dependent on the temperature of the permanent magnet.

5. The method of claim 1, wherein a temperature of at least one component of the electrical machine is ascertained from the temperature of the permanent magnet.

6. The method of claim 5, wherein the at least one component of the electrical machine encompasses a rotor shaft, a rotor winding, a rotor bearing, the stator winding, a power converter, and a control device.

7. The method of claim 5, wherein the electrical machine is operated as a function of the temperature of the at least one component of the electrical machine.

8. The method of claim 1, wherein the electrical machine is operated in motor mode and/or generator mode.

9. The method of claim 1, wherein a rotation speed and/or an angular position of the rotor is ascertained from the sensed magnetic property of the permanent magnet dependent on the temperature of the permanent magnet.

10. A processing unit, comprising:
    a processing arrangement for measuring a temperature of a permanent magnet disposed on a rotor of an electrical machine, by performing the following:
    sensing a magnetic property of the permanent magnet dependent on the temperature of the permanent magnet;
    determining the temperature of the permanent magnet therefrom; and
    indirectly determining a temperature of at least one component of the rotor based on the temperature of the permanent magnet;
    wherein the at least one component of the rotor includes at least one of a rotor shaft, a bearing, an exciter winding, or a stator winding.

11. A computer readable medium having a computer program, which is executable by a processor, comprising:
    a program code arrangement having program code for measuring a temperature of a permanent magnet disposed on a rotor of an electrical machine, by performing the following:
    sensing a magnetic property of the permanent magnet dependent on the temperature of the permanent magnet;
    determining the temperature of the permanent magnet therefrom; and
    indirectly determining a temperature of at least one component of the rotor based on the temperature of the permanent magnet;
    wherein the at least one component of the rotor includes at least one of a rotor shaft, a bearing, an exciter winding, or a stator winding.

12. The computer readable medium of claim 11, wherein the temperature of the permanent magnet is ascertained from the value of the magnetic property of the permanent magnet dependent on the temperature of the permanent magnet.

13. An electrical machine, comprising:
    a stator;
    a rotor;
    a permanent magnet disposed on the rotor;
    a magnetic field sensor; and a processing unit configured for measuring a temperature of the permanent magnet disposed on the rotor, by performing the following:

sensing a magnetic property of the permanent magnet dependent on the temperature of the permanent magnet;

determining the temperature of the permanent magnet therefrom; and indirectly determining a temperature of at least one component of the rotor based on the temperature of the permanent magnet.

14. The electrical machine of claim 13, wherein the permanent magnet is fastened on a rotor shaft of the rotor so that at at least one location on the rotor shaft, a temperature difference of less than 10 K exists between the permanent magnet and the rotor shaft.

15. The electrical machine of claim 13, wherein the remanent flux density of the permanent magnet exhibits a temperature dependence of at least 0.1%/K.

16. The electrical machine of claim 13, wherein the at least one component of the rotor includes at least on of a rotor shaft, a bearing an exciter winding, or a stator winding.

17. The method of claim 1, wherein the at least one component of the rotor includes at least one of a rotor shaft, a bearing, an exciter winding, or a stator winding.

\* \* \* \* \*